US012377834B2

(12) United States Patent
Kobayashi

(10) Patent No.: US 12,377,834 B2
(45) Date of Patent: Aug. 5, 2025

(54) VEHICLE BEHAVIOR CONTROL APPARATUS

(71) Applicant: Honda Motor Co., Ltd., Tokyo (JP)

(72) Inventor: Shinya Kobayashi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 18/403,722

(22) Filed: Jan. 4, 2024

(65) Prior Publication Data

US 2024/0300477 A1 Sep. 12, 2024

(30) Foreign Application Priority Data

Mar. 9, 2023 (CN) ......................... 202310222968.8

(51) Int. Cl.
B60W 30/00 (2006.01)
B60L 7/24 (2006.01)
B60W 10/08 (2006.01)
B60W 10/184 (2012.01)
B60W 10/196 (2012.01)

(52) U.S. Cl.
CPC ............. B60W 30/00 (2013.01); B60L 7/24 (2013.01); B60W 10/08 (2013.01); B60W 10/184 (2013.01); B60W 10/196 (2013.01); B60L 2250/26 (2013.01); B60W 2540/10 (2013.01); B60W 2710/083 (2013.01); B60W 2710/18 (2013.01)

(58) Field of Classification Search
CPC .... B60W 30/00; B60W 10/08; B60W 10/184; B60W 10/196; B60W 2250/26; B60W 2540/10; B60W 2710/083; B60W 2710/18; B60L 7/24; B60L 7/18; H02P 1/00; B60T 8/1755; B60K 31/00
USPC ........................................................ 701/22
See application file for complete search history.

(56) References Cited

U.S. PATENT DOCUMENTS 9,855,936 B2 * 1/2018 Bousamra ................. B60T 8/52
2005/0200197 A1 * 9/2005 Crombez ............. B60L 15/2009
303/152

(Continued)

FOREIGN PATENT DOCUMENTS

EP 4282718 A1 * 11/2023 ............. B60T 7/042
JP 2020125057 8/2020
WO WO-2006129820 A1 * 12/2006 ........... B60T 8/1755

Primary Examiner — Tuan C To
(74) Attorney, Agent, or Firm — JCIPRNET

(57) ABSTRACT

A vehicle behavior control apparatus is provided, which includes a driving force generating apparatus, configured to generate a required driving force of a vehicle according to an operation of an accelerator operator by a driver; a friction braking apparatus, configured to control a friction braking force of front and rear wheels of the vehicle; a regenerative braking apparatus, configured to generate a regenerative braking force through a motor connected to the front and rear wheels according to the required driving force; a braking force distribution apparatus, configured to determine a required braking force required to brake the vehicle and perform distribution control on each braking force between the friction braking apparatus and the regenerative braking apparatus; and a driving force adjusting apparatus, configured to calculate a torque correction amount for correcting a driving torque of the motor according to a driving condition and adjust a driving force of each wheel.

4 Claims, 4 Drawing Sheets

(56) References Cited

U.S. PATENT DOCUMENTS

| | | | |
|---|---|---|---|
| 2021/0101598 A1* | 4/2021 | Kim | B60L 7/26 |
| 2021/0179106 A1* | 6/2021 | Kim | B60W 30/162 |
| 2023/0137189 A1* | 5/2023 | Oh | B60W 30/18172 |
| | | | 701/80 |
| 2023/0182699 A1* | 6/2023 | Hara | B60L 7/26 |
| | | | 701/71 |

\* cited by examiner

VEHICLE BEHAVIOR CONTROL APPARATUS

CROSS-REFERENCE TO RELATED APPLICATION

This application claims the priority benefit of China application serial no. 202310222968.8, filed on Mar. 9, 2023. The entirety of the above-mentioned patent application is hereby incorporated by reference herein and made a part of this specification.

BACKGROUND

Technical Field

The disclosure relates to a control apparatus, and in particular to a vehicle behavior control apparatus.

Description of Related Art

In recent years, efforts to provide access to sustainable transportation systems that also take into account vulnerable persons such as the elderly and children among traffic participants have been active. Research and development are devoted to further improving the safety or convenience of traffic through developments related to behavioral stability of vehicles.

Patent Document 1 (Japanese Patent Application Laid-Open No. 2020-125057) discloses a vehicle behavior control apparatus that adjusts a vehicle behavior through correcting a driving torque of a motor on an acceleration side or a deceleration side.

Generally, when the rotation direction of the motor is switched, a contact surface of a gear of the motor changes and a kickback (vibration or hammering sound caused by impact) is generated. Therefore, near the zero driving force of the driving torque of the motor, the kickback may occur when the driving torque of the motor is corrected on the acceleration side.

In terms of driving stability of the vehicle, how to prevent the occurrence of the kickback of the motor is a topic for designers in the art.

The disclosure aims to correct the driving torque of the motor and braking force distribution control according to a driving condition of the vehicle to improve the stability of the vehicle behavior, thereby contributing to the development of the sustainable transportation systems.

SUMMARY

The disclosure provides a vehicle behavior control apparatus, which includes a driving force generating apparatus, a friction braking apparatus, a regenerative braking apparatus, a braking force distribution apparatus, and a driving force adjusting apparatus. The driving force generating apparatus is configured to generate a required driving force of a vehicle according to an operation of an accelerator operator by a driver. The friction braking apparatus is configured to control a friction braking force of at least one of a front wheel and a rear wheel of the vehicle. The regenerative braking apparatus is configured to generate a regenerative braking force through a motor connected to at least one of the front wheel and the rear wheel of the vehicle according to the required driving force. The braking force distribution apparatus is configured to determine a required braking force required to brake the vehicle and perform distribution control on each braking force between the friction braking apparatus and the regenerative braking apparatus to achieve the required braking force. The driving force adjusting apparatus is configured to calculate a torque correction amount for correcting a driving torque of the motor according to a driving condition of the vehicle and adjust a driving force of each wheel of the vehicle based on the torque correction amount. When the regenerative braking force is generated during a period of the braking force distribution apparatus executing the distribution control, the driving force adjusting apparatus reduces correction of the driving torque on an acceleration side.

DESCRIPTION OF THE EMBODIMENTS

Figure 1:
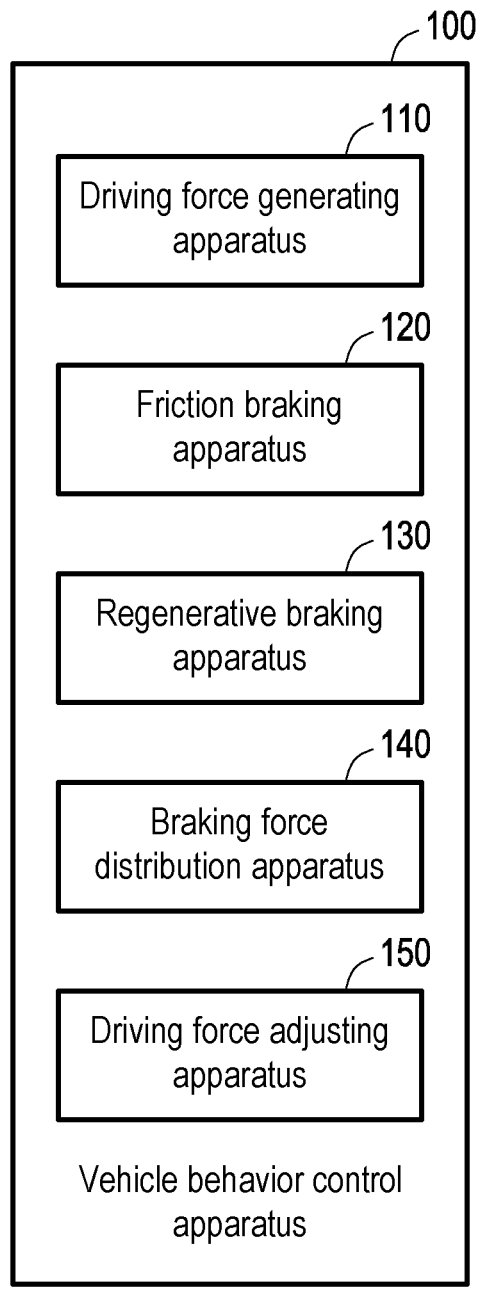
FIG. 1 is a schematic block diagram of a vehicle behavior control apparatus according to an embodiment of the disclosure.

According to the above structure, when the regenerative braking force is generated during the process of the braking force distribution apparatus executing the distribution control, through suppressing the correction of the driving torque on the acceleration side, an occurrence of impact and abnormal noise caused by the driving torque of the motor approaching a zero driving force can be suppressed. In addition, even when the regenerative braking force is generated during the process of the braking force distribution apparatus executing the distribution control, the correction of the driving torque of the motor on the acceleration side is also reduced, so interruption of the distribution control by the braking force distribution apparatus can be suppressed.

In an embodiment of the disclosure, the braking force distribution apparatus generates the regenerative braking force and reduces generation of the friction braking force when the driving torque of the motor is zero or less.

According to the above structure, through suppressing the correction of the driving torque on the acceleration side when the driving torque of the motor is zero or less, the occurrence of impact and abnormal noise caused by the driving torque of the motor approaching the zero driving force can be suppressed. Furthermore, even when the driving torque of the motor is zero or less, the correction of the driving torque of the motor on the acceleration side is also reduced, so interruption of the distribution control by the braking force distribution apparatus can be suppressed.

In an embodiment of the disclosure, when the regenerative braking force is generated during the process of the braking force distribution apparatus executing the distribution control, the driving force adjusting apparatus allows the correction of the driving torque on a deceleration side.

According to the structure, when the regenerative braking force is generated during the process of the braking force distribution apparatus executing the distribution control, the correction of the driving torque on the deceleration side is allowed, and vehicle behavior control may be executed even during a regenerative braking period, thereby improving riding comfort.

Based on the above, when regenerative braking is used instead of friction braking during a braking force distribution control operating period, a response to changes in the driving torque of the motor cannot be reduced because a response to a braking operation cannot be hindered. Since the driving torque of the motor approaches the zero driving force, the ratio of suppressing impact and abnormal noise cannot be reduced. Therefore, the vehicle behavior control apparatus of the disclosure can suppress generation of impact and noise caused by the driving torque of the motor approaching the zero driving force through suppressing the correction of the driving torque of the motor on the acceleration side in a braking force distribution control operation. In addition, since an acceleration command is not issued in a deceleration state in a regenerative coordination operation, interruption of the distribution control can be suppressed.

In order for the features and advantages of the disclosure to be more comprehensible, the following specific embodiments are described in detail in conjunction with the drawings.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

In the embodiment of the disclosure, a driving force adjusting apparatus corrects a driving torque of a motor according to a driving condition of a vehicle, and a braking force distribution apparatus performs distribution control (regenerative coordination) on each braking force between a friction braking apparatus and a regenerative braking apparatus. The driving torque of the motor is corrected during a regenerative coordination action to reduce a correction amount on an acceleration side (a positive side).

FIG. 1 is a schematic block diagram of a vehicle behavior control apparatus according to an embodiment of the disclosure. Please refer to FIG. 1. A vehicle behavior control apparatus 100 of the embodiment is, for example, disposed in a vehicle to control a behavior of the vehicle. In the embodiment, the vehicle itself includes, for example, a car using an internal combustion engine such as a diesel engine or a gasoline engine as a power source, an electric car using a motor as a power source, a hybrid car having both an internal combustion engine and a motor, etc.

The vehicle behavior control apparatus 100 includes a driving force generating apparatus 110, a friction braking apparatus 120, a regenerative braking apparatus 130, a braking force distribution apparatus 140, and a driving force adjusting apparatus 150. A part or all of the above apparatuses may be implemented by a processor executing a program. Moreover, a part or all of the above apparatuses may also be implemented through hardware such as a large scale integration (LSI) circuit or an application specific integrated circuit (ASIC), or may also be implemented through a combination of software and hardware, and the embodiment does not limit the implementation thereof.

The driving force generating apparatus 110 is, for example, a diesel engine, a gasoline engine, a motor, or a hybrid power generating apparatus having both an internal combustion engine and a motor and is configured to generate a required driving force of the vehicle according to an operation of an accelerator operator by a driver. The accelerator operator is, for example, an accelerator pedal (AP), but not limited thereto. In other embodiments, the accelerator operator may also be an accelerator operator in a system such as autonomous driving and cruise control of the vehicle, but not limited thereto.

The friction braking apparatus 120 is configured to control a friction braking force of at least one of the front wheel and the rear wheel of the vehicle. In some embodiments, the friction braking apparatus 120 generates friction through rubbing a brake disc made of cast iron or composite ceramics against a brake pad to brake the vehicle. In some embodiments, the friction braking apparatus 120 may also brake the vehicle through other manners such as hydraulic pressure, air braking, or resistance braking. The embodiment does not limit the braking manner.

The regenerative braking apparatus 130 is configured to recover kinetic energy of the vehicle dissipated as heat by a friction braking system. The regenerative braking apparatus 130 is connected to the motor of at least one of the front wheel and the rear wheel of the vehicle itself to control the motor to generate a regenerative braking force on the front wheel or the rear wheel according to a required braking force. The recovery of the kinetic energy is to use the motor as a generator during a braking period to convert the kinetic energy of the vehicle into electricity to be stored in a battery or other energy storage equipment. In some embodiments, the regenerative braking apparatus 130 may generate the regenerative braking force through adjusting a rotation speed of the motor, but not limited thereto.

The braking force distribution apparatus 140 is configured to determine the required braking force required to brake the vehicle and perform distribution control (that is, regenerative coordination control) on each braking force between the friction braking apparatus 120 and the regenerative braking apparatus 130 to achieve the required braking force. The required braking force is, for example, a braking force determined by the driver of the vehicle or a vehicle behavior stability control system according to a current driving condition. The regenerative coordination control, for example, prohibits regenerative braking and generates the friction braking force to achieve the required braking force within a time interval from the return of the accelerator operator until a driving torque of the motor becomes zero. After the driving torque of the motor becomes zero, the prohibition of the regenerative braking is released and the friction braking force is reduced.

The driving force adjusting apparatus 150 is configured to calculate a torque correction amount for correcting the driving torque of the motor according to the driving condition of the vehicle and adjust a driving force of each wheel of the vehicle based on the torque correction amount. When the regenerative braking force is generated during a process of the braking force distribution apparatus 140 executing the distribution control, the driving force adjusting apparatus 150 may reduce (limit) correction of the driving torque on an acceleration side (a positive side) to prevent a kickback of the motor. In some embodiments, the driving force adjusting apparatus 150 implements the correction of reducing the driving torque on the acceleration side through changing a threshold for the correction to a lower value or reducing a coefficient and a correction amount, and the embodiment does not limit the implementation thereof.

Therefore, when the regenerative braking force is generated during the period of the braking force distribution apparatus 140 executing the distribution control, through suppressing the correction of the driving torque on the acceleration side, an occurrence of impact and abnormal noise caused by the driving torque of the motor approaching a zero driving force can be suppressed. Furthermore, even when the regenerative braking force is generated during the period of the braking force distribution apparatus 140 executing the distribution control, the correction of the driving torque of the motor on the acceleration side is also reduced, so interruption of the distribution control by the braking force distribution apparatus 140 can be suppressed.

In some embodiments, the driving force adjusting apparatus 150 generates the regenerative braking force and reduces generation of the friction braking force when the driving torque of the motor is zero or less.

Accordingly, through suppressing the correction of the driving torque on the acceleration side when the driving torque of the motor is zero or less, the occurrence of impact and abnormal noise caused by the driving torque of the motor approaching the zero driving force can be suppressed. Furthermore, even when the driving torque of the motor is zero or less, the correction of the driving torque of the motor on the acceleration side is also reduced, so interruption of the distribution control by the braking force distribution apparatus 140 can be suppressed.

In some embodiments, the driving force adjusting apparatus 150 allows the correction of the driving torque on a deceleration side when the regenerative braking force is generated during the period of the braking force distribution apparatus 140 executing the distribution control.

Thereby, when the regenerative braking force is generated during the period of the braking force distribution apparatus 140 executing the distribution control, the correction of the driving torque on the deceleration side is allowed, and vehicle behavior control may be executed even during a regenerative braking period, thereby improving riding comfort.

Figure 2A:
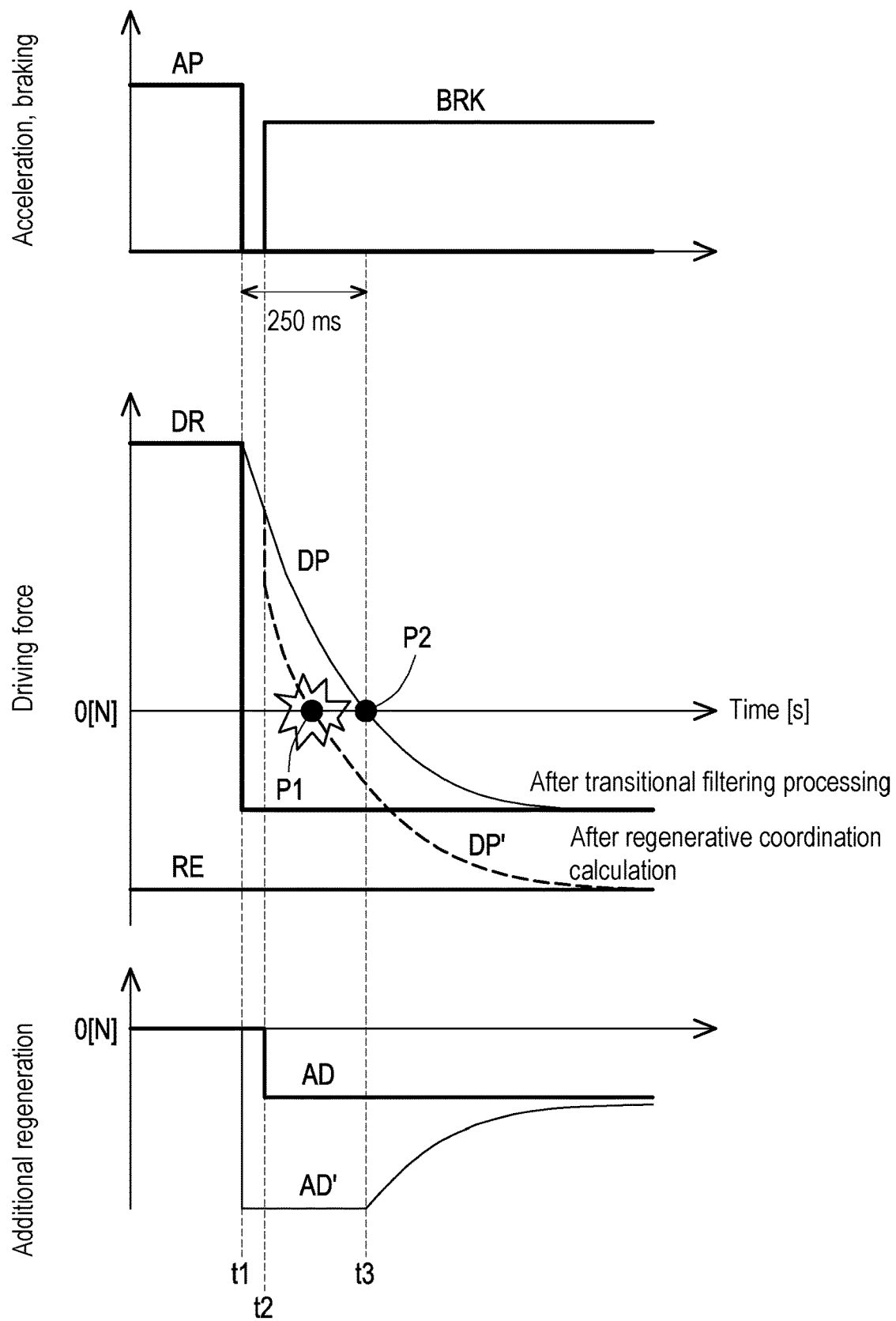
FIG. 2A and FIG. 2B illustrate a comparative example of vehicle behavior control according to an embodiment of the disclosure.
Figure 2B:
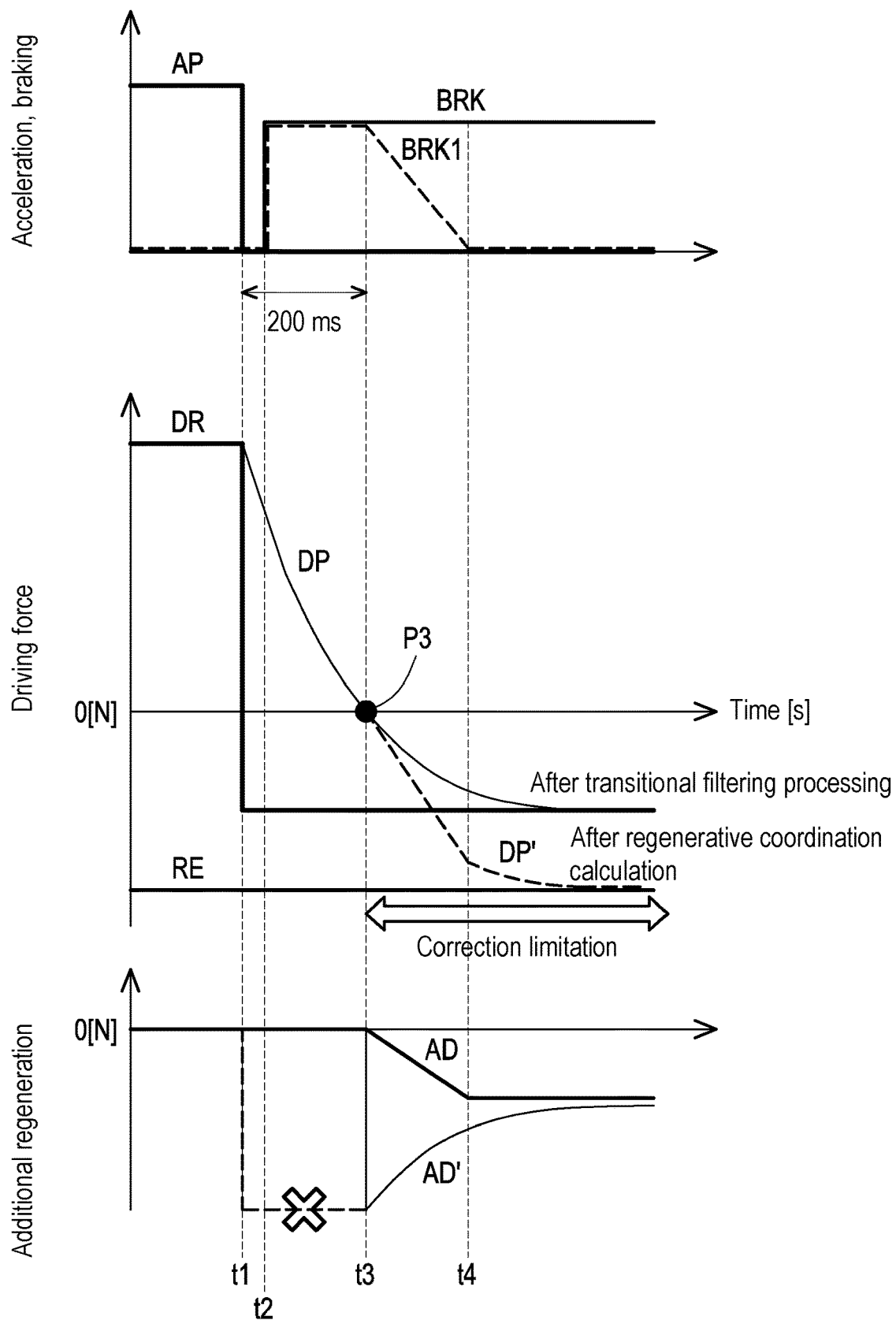

FIG. 2A and FIG. 2B illustrate a comparative example of vehicle behavior control according to an embodiment of the disclosure. FIG. 2A illustrates traditional vehicle behavior control, and FIG. 2B illustrates vehicle behavior control according to an embodiment of the disclosure, which is adapted to the vehicle behavior control apparatus 100 of FIG. 1.

Please refer to FIG. 2A first. The traditional vehicle behavior control prohibits performing filtering processing on regenerative coordination. Therefore, after adding the regenerative coordination, impact of crossing a zero driving force occurs.

First, in response to the operation of the accelerator pedal by the driver of the vehicle, the vehicle behavior control calculates a required driving force DR meeting a driver acceleration intention according to parameters such as an accelerator pedal opening AP and a vehicle speed.

As the driver releases the accelerator pedal at a time point t1, a driving force DP after transitional filtering processing starts to decrease. The regenerative coordination starts at a time point t2, and the regenerative braking apparatus provides a required braking force BRK. At this time, the driving force DP of the vehicle is affected by an additional regenerative driving force AD of the regenerative coordination (actually a reduction additional regenerative driving force AD') and decreases to become a driving force DP' after regenerative coordination calculation. The driving force DP' gradually decreases to approach a regenerative reduction value RE.

The decreasing driving force DP' crosses the zero driving force at a point P1. At this time, due to switching of the rotation direction of the motor, a contact surface of a gear of the motor changes and impact is generated.

In contrast, the decreasing driving force DP crosses the zero driving force at a point P2. At this time, through the reduction additional regenerative driving force AD', the correction of the driving torque on the acceleration side at a time point t3 is reduced to prevent the kickback of the motor.

Please refer to FIG. 1 and FIG. 2B at the same time. The vehicle behavior control of the embodiment is to allow the regenerative coordination (limitation calculation) after the driving force after the transitional filtering processing reaches a regenerative region to prevent crossing the zero driving force after the regenerative coordination is added.

First, in response to the operation of the accelerator pedal by the driver of the vehicle, the driving force generating apparatus 110 calculates the required driving force DR meeting the driver acceleration intention according to parameters such as the accelerator pedal opening AP and the vehicle speed.

As the driver releases the accelerator pedal at the time point t1, the driving force DP after the transitional filtering processing starts to decrease. Different from the manner of FIG. 2A, in the embodiment, at the time point t2, the friction braking apparatus 120 generates a friction braking force BRK1 to provide the required braking force BRK. At this time, the driving force DP of the vehicle is affected by the friction braking force BRK1 and decreases.

The decreasing driving force DP crosses the zero driving force at a point P3. At this time, through executing the distribution control by the braking force distribution apparatus 140, the friction braking force BRK1 provided by the friction braking apparatus 120 is reduced, and the regenerative braking apparatus 130 supplements a braking force required to achieve the required braking force BRK. At this time, the driving force DP of the vehicle is affected by the additional regenerative driving force AD of the regenerative coordination (actually the reduction additional regenerative driving force AD' generated at the time point t3) and decreases to become the driving force DP' after the regenerative coordination calculation. The driving force DP' gradually decreases to approach the regenerative reduction value RE.

It should be noted that the driving force adjusting apparatus 150 executes correction limitation near the point P3 where the driving force DP crosses the zero driving force to reduce the correction of the driving torque on the acceleration side. In this way, the kickback of the motor can be prevented.

Figure 3:
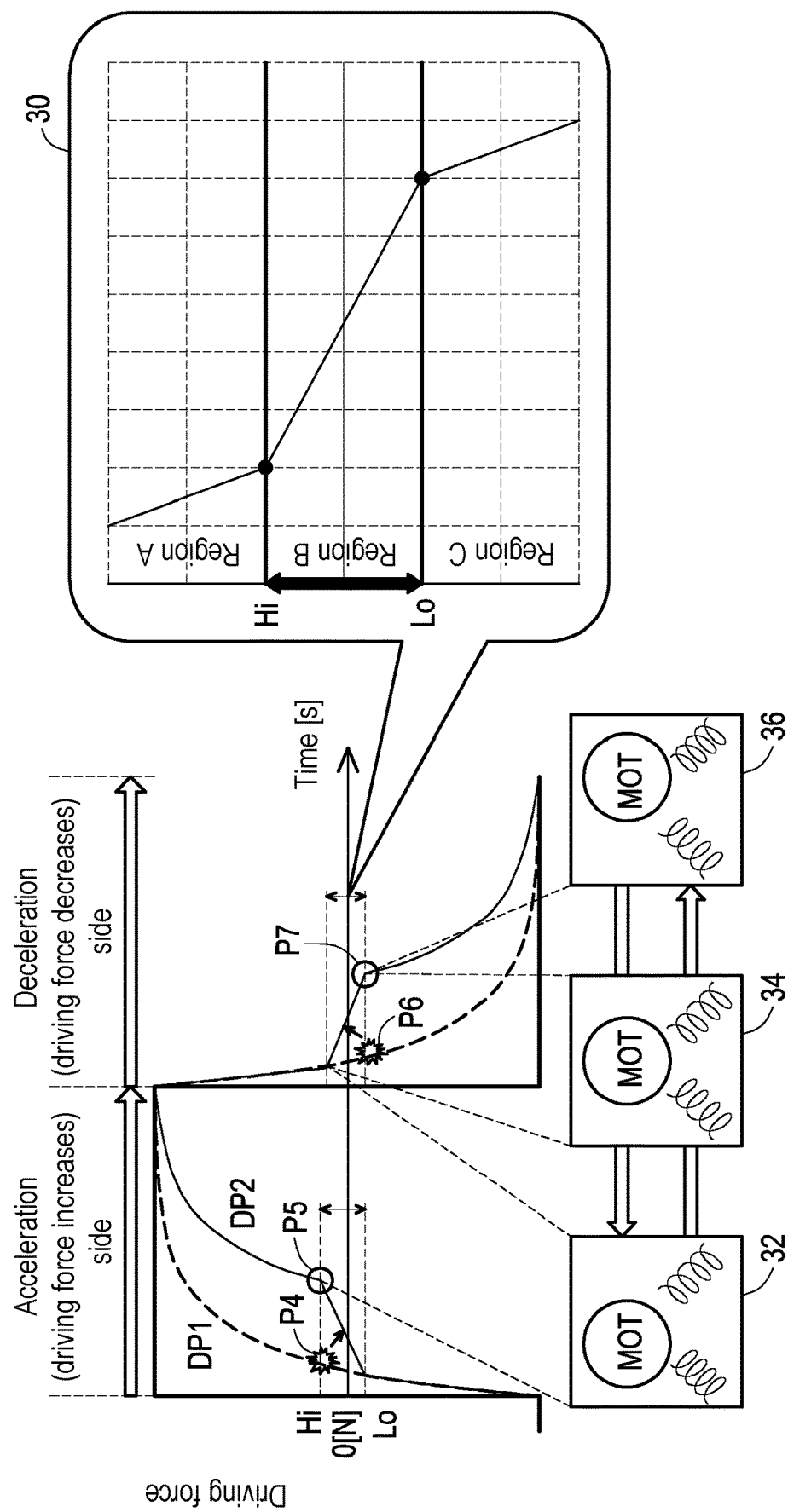
FIG. 3 illustrates an example of calculating a zero-crossing region driving force according to an embodiment of the disclosure.

In detail, FIG. 3 illustrates an example of calculating a zero-crossing region driving force according to an embodiment of the disclosure. Please refer to FIG. 3. In the embodiment, the driving force adjusting apparatus 150 slowly changes the driving force in a region where impact is expected to occur to prevent impact from a driving system. DP1 illustrates a change curve of a driving force not executed with zero-crossing processing, and DP2 illustrates a change curve of a driving force executed with the zero-crossing processing.

On the acceleration side (that is, a side where the driving force increases), when the driving force DP1 not executed with the zero-crossing processing passes through zero crossing and an acceleration-side zero-crossing smoothing range formed by a threshold Hi and a threshold Lo, since the correction of the driving torque of the motor is performed near the zero driving force, impact may occur at a point P4.

In contrast, when the driving force DP2 executed with the zero-crossing processing passes through the acceleration-side zero-crossing smoothing range, since the driving force changes in a gentler manner, no impact occurs at a point P5.

On the deceleration side (that is, a side where the driving force decreases), when the driving force DP1 not executed with the zero-crossing processing passes through zero crossing and a deceleration-side zero-crossing smoothing range formed by the threshold Hi and the threshold Lo, since the correction of the driving torque of the motor is performed near the zero driving force, impact may also occur at a point P6.

In contrast, when the driving force DP2 executed with the zero-crossing processing passes through the deceleration-side zero-crossing smoothing range, since the driving force changes in a gentler manner, no impact occurs at a point P7.

It can be seen from installation diagrams 32, 34, and 36 of a motor MOT that the relative position of the motor MOT and the gear changes within the deceleration-side zero-crossing smoothing range. That is, within an interval when the driving force DP2 changes from the threshold Hi on the acceleration side to the threshold Hi on the deceleration side, the position of the motor MOT shifts to the left. Within an interval when the driving force DP2 changes from the threshold Hi on the deceleration side to the threshold Lo on the deceleration side, the position of the motor MOT is maintained at a neutral point. After an interval after the driving force DP2 enters the threshold Lo on the deceleration side, the position of the motor MOT shifts to the right. Therefore, the driving force needs to be slowly corrected within the zero-crossing smoothing range near the zero driving force to reduce the kickback caused by the shift of the motor MOT.

In addition, it can be seen from an enlarged diagram 30 of the deceleration-side zero-crossing smoothing range that the threshold Hi and the threshold Lo may divide the driving force near the zero driving force into regions A, B, and C.

In the region A, the driving force adjusting apparatus 150, for example, selects the minimum value from an existing driving force rate and an absolute value of a difference value between the threshold Hi and a filtered driving force to generate the driving force DP2 executed with the zero-crossing processing.

In the region B, the driving force adjusting apparatus 150, for example, selects the minimum value from the existing driving force rate, an absolute value of a difference value between the threshold Lo and the filtered driving force, and a necessary rate to suppress impact to generate the driving force DP2 executed with the zero-crossing processing.

In the region C, the driving force adjusting apparatus 150 directly selects the existing driving force rate to generate the driving force DP2 executed with the zero-crossing processing.

In summary, the vehicle behavior control apparatus of the disclosure can suppress generation of impact and noise caused by the driving torque of the motor approaching the zero driving force through suppressing the correction of the driving torque of the motor on the acceleration side in a braking force distribution control operation. In addition, since an acceleration command is not issued in a deceleration state in a regenerative coordination operation, interruption of the distribution control can be suppressed.

Finally, it should be noted that the above embodiments are only configured to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A vehicle behavior control apparatus, comprising:
   a driving force generating apparatus, generating a required driving force of a vehicle according to an operation of an accelerator operator by a driver;
   a friction braking apparatus, controlling a friction braking force of at least one of a front wheel and a rear wheel of the vehicle;
   a regenerative braking apparatus, generating a regenerative braking force through a motor connected to at least one of the front wheel and the rear wheel of the vehicle according to the required driving force;
   a braking force distribution apparatus, determining a required braking force required to brake the vehicle and performing distribution control on each braking force between the friction braking apparatus and the regenerative braking apparatus to achieve the required braking force; and
   a driving force adjusting apparatus, calculating a torque correction amount for correcting a driving torque of the motor according to a driving condition of the vehicle and adjusting a driving force of each wheel of the vehicle based on the torque correction amount, wherein
   when the regenerative braking force is generated during a period of the braking force distribution apparatus executing the distribution control, the driving force adjusting apparatus reduces correction of the driving torque on an acceleration side.

2. The vehicle behavior control apparatus according to claim 1, wherein:
   the braking force distribution apparatus generates the regenerative braking force and reduces generation of the friction braking force when the driving torque of the motor is zero or less.

3. The vehicle behavior control apparatus according to claim 1, wherein:
   when the regenerative braking force is generated during the period of the braking force distribution apparatus executing the distribution control, the driving force adjusting apparatus allows the correction of the driving torque on a deceleration side.

4. The vehicle behavior control apparatus according to claim 2, wherein:
   when the regenerative braking force is generated during the period of the braking force distribution apparatus executing the distribution control, the driving force adjusting apparatus allows the correction of the driving torque on a deceleration side.

* * * * *